United States Patent
Date (10) Patent No.: US 6,285,482 B1
(45) Date of Patent: *Sep. 4, 2001

(54) OPTICAL DEFLECTING-SCANNING APPARATUS

(75) Inventor: Nobuaki Date, Mishima (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/097,730

(22) Filed: Jun. 16, 1998

(30) Foreign Application Priority Data

Jun. 18, 1997 (JP) .................................................... 9-177595
Jun. 3, 1998 (JP) .................................................... 10-170585

(51) Int. Cl.$^7$ ..................................................... G02B 26/08
(52) U.S. Cl. ......................... 359/196; 359/197; 359/212; 359/216
(58) Field of Search ..................................... 359/196–219; 347/245, 263

(56) References Cited

U.S. PATENT DOCUMENTS

| 4,930,869 | * | 6/1990 | Miyagawa et al. | 359/217 |
| 4,934,836 | * | 6/1990 | Tanaka et al. | 359/200 |
| 5,046,797 | | 9/1991 | Kurisu et al. . | |

FOREIGN PATENT DOCUMENTS

| 0 618 469 | 10/1994 | (EP) . |
| 0 692 726 | 1/1996 | (EP) . |
| 61-97620 | 5/1986 | (JP) . |
| 2-99910 | 4/1990 | (JP) . |
| 7-64010 | 3/1995 | (JP) . |

* cited by examiner

*Primary Examiner*—James Phan
(74) *Attorney, Agent, or Firm*—Fitzpatrick, Cella, Harper & Scinto

(57) ABSTRACT

An optical deflecting-scanning apparatus includes a deflector for deflecting a light beam to scan, a driving device for rotationally driving the deflector, a cover having a cylindrical portion to cover a peripheral surface of the deflector and an annular slit provided in the cylindrical portion of the cover and extending in a circumferential direction of the deflector. The slit opens along the entire circumference of the deflector.

26 Claims, 6 Drawing Sheets

OPTICAL DEFLECTING-SCANNING APPARATUS

BACKGROUND OF THE INVENTION

1. Field of the Invention

The present invention relates to an optical deflecting-scanning apparatus used in such image forming apparatus as laser beam printers or digital copiers.

2. Related Background Art

The optical deflecting-scanning apparatus used in such image forming apparatus as laser beam printers or digital copiers is constructed to reflect a light beam such as a laser beam by a rotary polygon mirror and deflect the beam to scan with high-speed rotation of the rotary polygon mirror. The scanning light thus obtained is focused on a photosensitive member on a rotating drum to form an electrostatic latent image thereon. Then the electrostatic latent image on the photosensitive member is developed into a toner image by a developing device, this image is transferred onto a recording medium such as a recording sheet, then the sheet is sent to a fixing device, and the toner on the recording medium is heated to be fixed by the fixing device, thereby achieving printing (print).

With increase in speed of the digital copiers etc., there are recently developed machines with the rotating speed of the rotary polygon mirror being over 30,000 rpm.

Figure 1A:
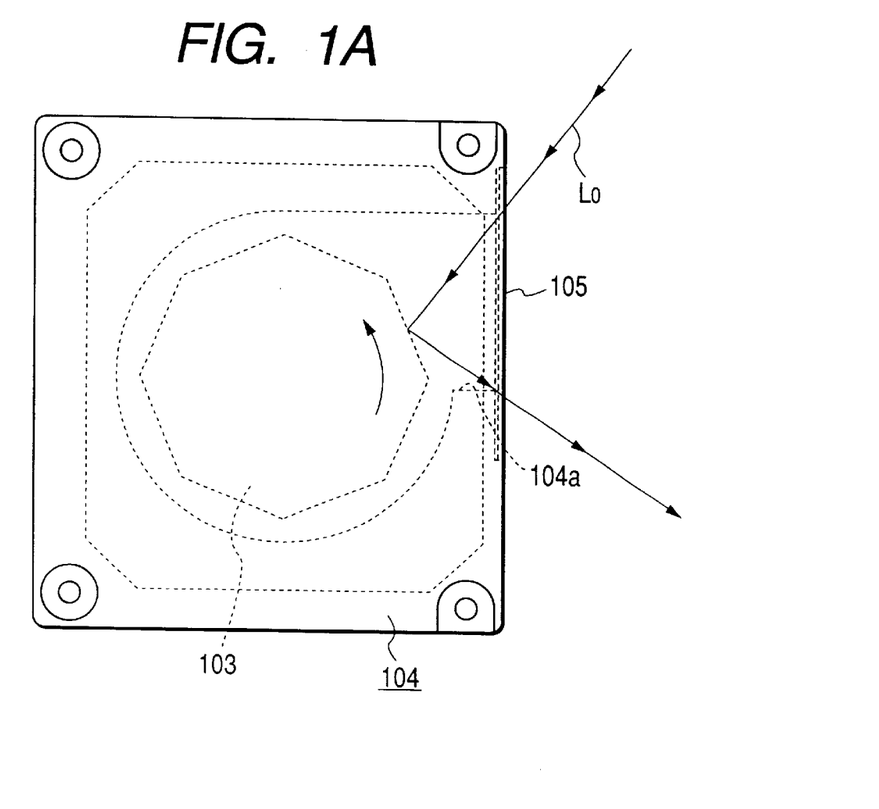
FIG. 1A is a partial plan view thereof and FIG. 1B a partial sectional view thereof.
Figure 1B:
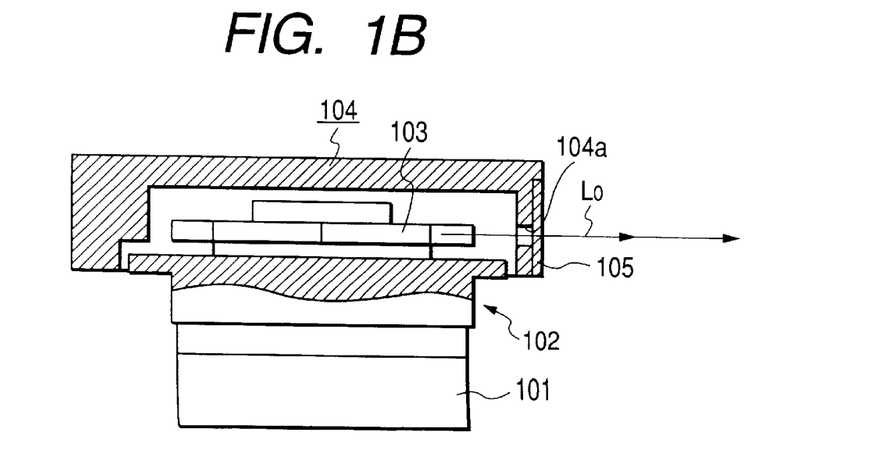

FIGS. 1A and 1B illustrate the main portion of an optical deflecting-scanning apparatus according to a conventional example, wherein the apparatus has a bearing 101 supported on an optical box (not illustrated) a motor 102 comprised of a rotor rotatably supported by the bearing 101 and a stator opposed thereto, and a rotary polygon mirror 103 integrated with the rotor by an elastic press mechanism or the like.

When the stator of the motor 102 is excited by driving current supplied from a driving circuit on a motor board, the rotor rotates the rotary polygon mirror 103 at high speed so as to deflect the light beam irradiating the rotary polygon mirror 103 to scan.

The rotary polygon mirror 103 is a polygonal member of a polygonal prism shape having a plurality of reflective surfaces, and the upper part of the rotary polygon mirror 103 and the motor is covered by a cover member 104. As the rotary polygon mirror 103 rotates at high speed, the air around it flows to cause wind noise or the like. Therefore, the apparatus is designed so as to prevent the wind noise or the like from leaking to the outside of the apparatus, by covering the periphery of the rotary polygon mirror 103 by the cover member 104.

The peripheral wall of the cover member 104 is provided with a window 104a opening so as not to intercept the light beam $L_0$ incident into and emergent from the rotary polygon mirror 103. The window 104a is an aperture formed by removing a part in an arcuate shape from the peripheral wall of the cover member 104, and a dustproof glass member 105 is attached to the window 104a.

With a conventional technology described above, however, the pressure gradient occurs in the air in the cover member with rotation of the rotary polygon mirror, so as to increase vibration sound etc. of the motor, and there is an unsolved issue that the noise cannot be suppressed sufficiently by simply covering the periphery of the rotary polygon mirror by the cover member.

In general, the noise appearing with high-speed rotation of the rotary polygon mirror results from superposition of various types of noise, which can be roughly classified under three types. The first type is the wind noise (air sound) produced when the rotary polygon mirror causes the air in the cover member to flow with rotation thereof, and leaking from the optical box; the second type is the vibration sound caused in such a way that rotation of the rotary polygon mirror creates a pressure gradient in the air in the cover member and that the stator (coil) of the motor vibrates with receiving reaction force when the rotary polygon mirror is rotated at high speed against the load; the third type is great noise caused by resonance or forced excitation or the like when such vibration of the stator propagates to the cover member and the optical box.

The cover member of the conventional example is designed to focus on only the first wind noise and simply covers the periphery of the rotary polygon mirror so as to prevent the wind noise from leaking to the outside. As long as the rotating speed of the rotary polygon mirror is relatively low, the wind noise itself is small and is not so significant even with a little leakage thereof from the cover member. The wind noise leaking from the cover member, however, increases with increase in the speed of the optical deflecting-scanning apparatus, and the second and third vibration sound is added to this, thereby resulting in heavy noise.

Figure 2:
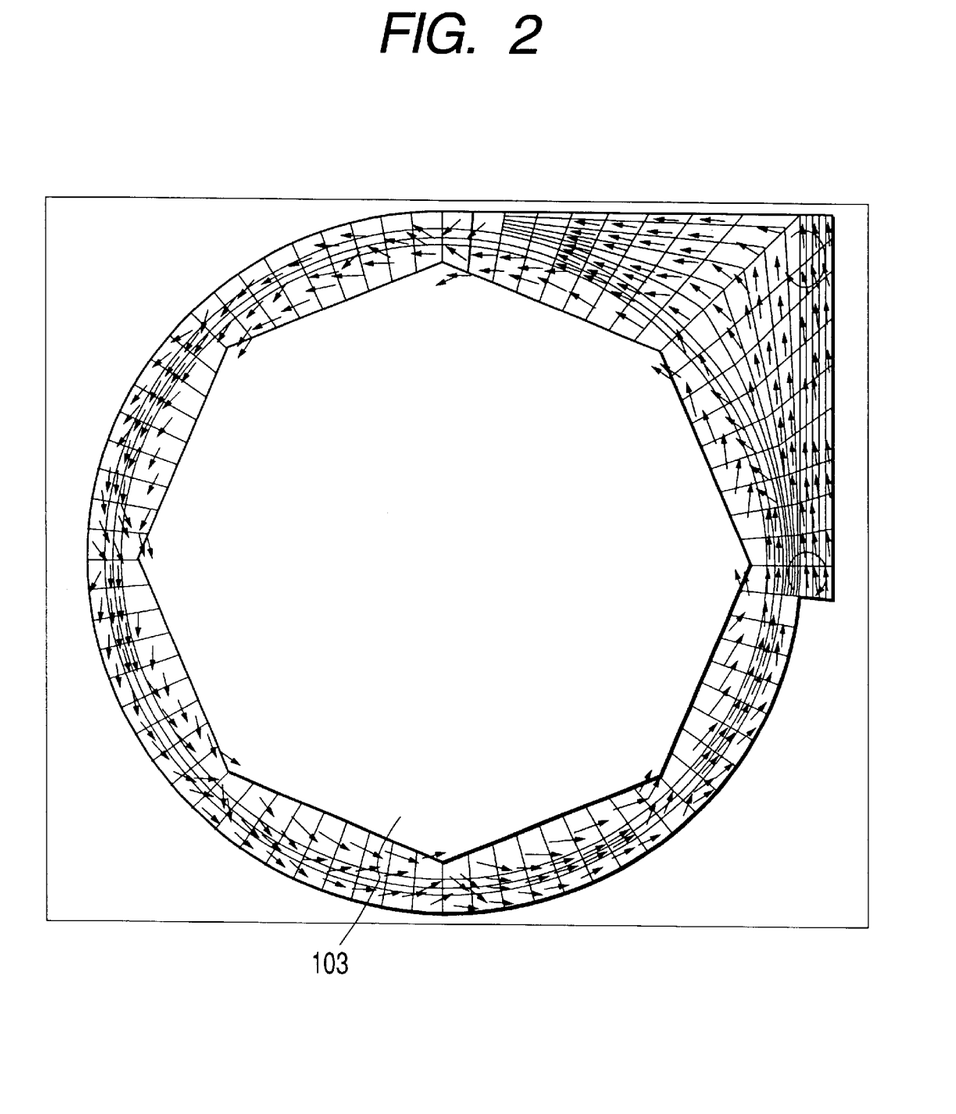
FIG. 2 is diagram to show the air flow occurring around the rotary polygon mirror.

FIG. 2 illustrates the air flow created in the cover member with rotation of the rotary polygon mirror, from which it is observed that the density of the air flow is small near the window of the cover member and as a consequence, the pressure of the air is locally decreased to create the pressure gradient.

SUMMARY OF THE INVENTION

The present invention has been accomplished in view of the unsolved issue of the above conventional technology, and an object of the present invention is to provide an optical deflecting-scanning apparatus that can greatly decrease the noise caused with rotation of the rotary polygon mirror.

For accomplishing the above object, an optical deflecting-scanning apparatus of the present invention comprises a rotary polygon mirror for deflecting a light beam to scan, driving means for rotationally driving the rotary polygon mirror, and a cover having a cylindrical portion to cover the peripheral surface of the rotary polygon mirror, wherein the cylindrical portion of the cover comprises an annular slit extending in the circumferential direction of the rotary polygon mirror, said slit opening along the entire circumference of the rotary polygon mirror.

In a preferred embodiment, the cover comprises a first cylindrical member to cover a top half of the rotary polygon mirror, and a second cylindrical member to cover a bottom half of the rotary polygon mirror and the annular slit is formed between the first and second cylindrical members.

In the optical deflecting-scanning apparatus of the present invention, the annular slit extending in the circumferential direction of the rotary polygon mirror is formed in the cylindrical portion of the cover covering the peripheral surface of the rotary polygon mirror, and the light beam is incident or emergent through a portion of the slit. Since the uniform flow passage having the annular slit is formed along the peripheral surface of the rotary polygon mirror, the air flow generated with rotation of the rotary polygon mirror is uniform in the circumferential direction in the cover.

Accordingly, the present invention can prevent occurrence of the pressure gradient in the cover, which was seen in the case where the window for incidence and emergence of the light beam was made by removing a part of the cover in the arcuate shape, and hence the vibration noise etc. due to the pressure gradient can be reduced remarkably.

Since the light beam irradiating the rotary polygon mirror is a beam of a sheet shape with a small thickness as converged in the axial direction of the rotary polygon mirror, the width of the slit for incidence and emergence thereof can be set small. Use of the annular slit with the small width achieves the effect of greatly reducing an amount of input and output air through the cover with rotation of the rotary polygon mirror and the effect of reducing a trouble such as noise or pollution with input and output of the air.

BRIEF DESCRIPTION OF THE DRAWINGS

FIGS. 1A and 1B are drawings to show the main portion of the optical deflecting-scanning apparatus according to the conventional example, wherein

FIGS. 3A and 3B are drawings to show the main portion of an embodiment of the optical deflecting-scanning apparatus of the present invention, wherein

DETAILED DESCRIPTION OF THE PREFERRED EMBODIMENT

An embodiment of the present invention will be described by reference to the drawings.

Figure 3A:
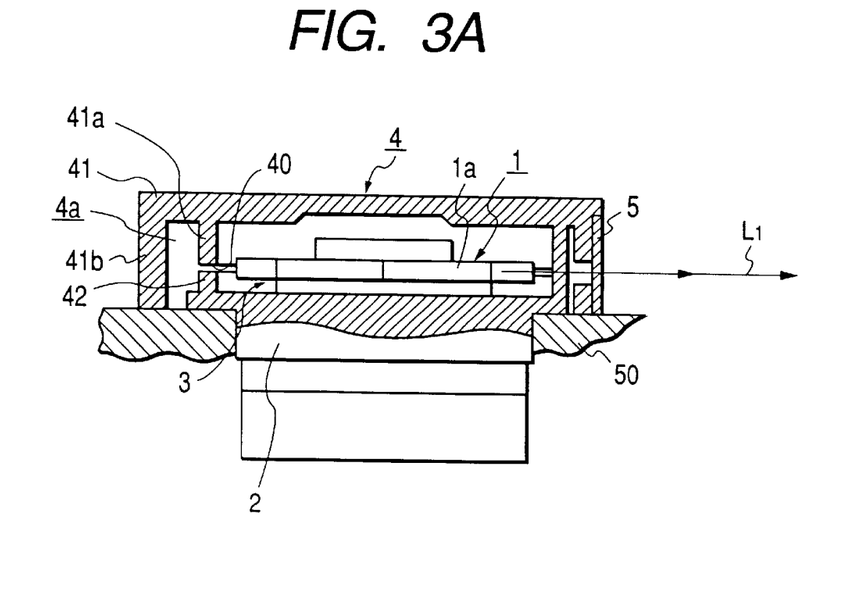
FIG. 3A is a partial sectional view thereof and FIG. 3B a partial plan view thereof.
Figure 3B:
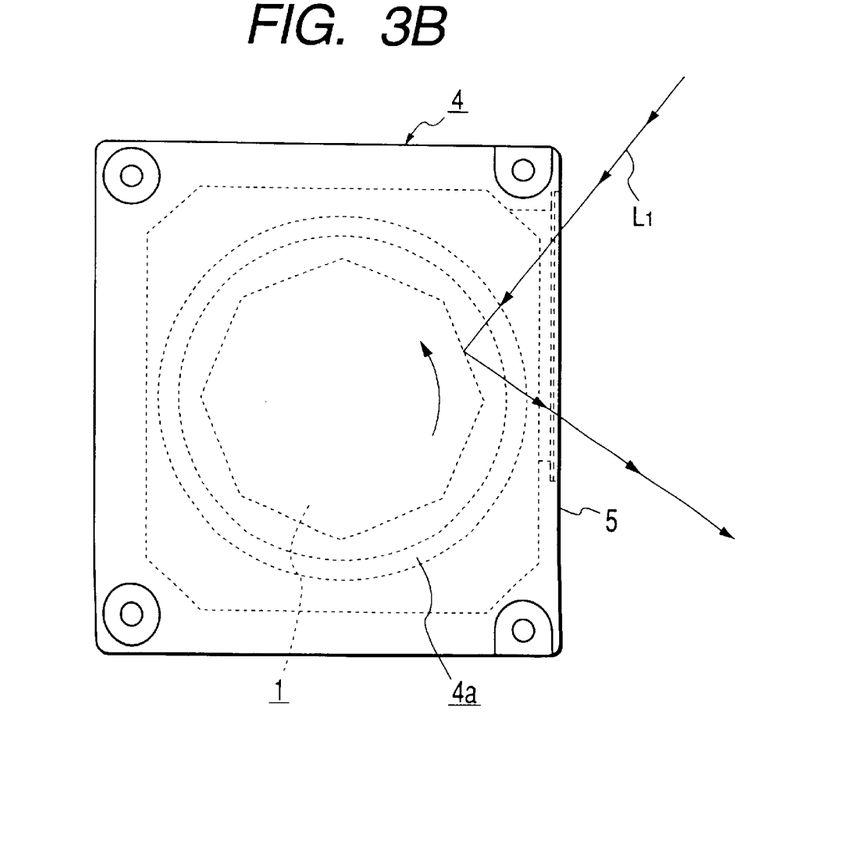

FIGS. 3A and 3B illustrate the main part of the embodiment of the optical deflecting-scanning apparatus according to the present invention. The apparatus has a rotary polygon mirror 1 of an octagonal prism shape having eight reflective surfaces 1a for reflecting an optical beam $L_1$ such as a laser beam emitted from a light source 51 (see FIG. 6), toward an imaging lens 52, a motor housing 2 fixed to an optical box 50, and a motor 3 as driving means comprised of a rotor integrated with the rotary polygon mirror 1, and a stator. A motor board on which the stator stands is screwed to the optical box 50.

When the stator (coil) is excited by driving current supplied from a driving circuit on the motor board, the rotor (magnet) rotates with the rotary polygon mirror 1. As the rotary polygon mirror 1 rotates, the light beam $L_1$ irradiating it is deflected to scan in the main scanning direction.

The upper part of the rotary polygon mirror 1 and motor 3 is covered by a cover 4 having an air guide 4a, which is a cylindrical portion provided with an annular (ring) slit 40. The air guide 4a is formed by a peripheral wall 41a of motor cap 41 as a first cylindrical member to surround the top half of the rotary polygon mirror 1, and a second cylindrical member 42 for covering the bottom half of the rotary polygon mirror 1, standing on the motor housing 2, and the slit 40 opening to the whole outside periphery (the entire circumference) of the rotary polygon mirror 1 is formed between the top end of the cylindrical member 42 and the bottom end of the peripheral wall 41a of the motor cap 41.

The width of the slit 40 is determined to be large enough for the light beam $L_1$, converged in a linear shape by a cylindrical lens 51a as described hereinafter, to pass. Namely, the light beam $L_1$ is converged as a sheet beam with a small width on the reflective surface 1a of the rotary polygon mirror 1 by the cylindrical lens 51a, and hence the slit 40 for permitting the beam to pass therethrough can also have a small width.

Outside the slit 40 of the air guide 4a there is an almost annular space formed by the structure where an outside peripheral portion 41b being a portion of the motor cap 41 covers the outside of the cylindrical member 42. In a portion corresponding to a window for guiding the light beam $L_1$ into or out of the air guide 4a, the slit 40 is directly open toward the outside of the air guide 4a. This structure will alleviate the trouble, such as noise, because of a large quantity of air flowing into the air guide 4a and contamination on the reflective surfaces 1a of the rotary polygon mirror 1. Then a dustproof glass member 5, similar to that in the conventional example, is suitably provided.

Figure 4:
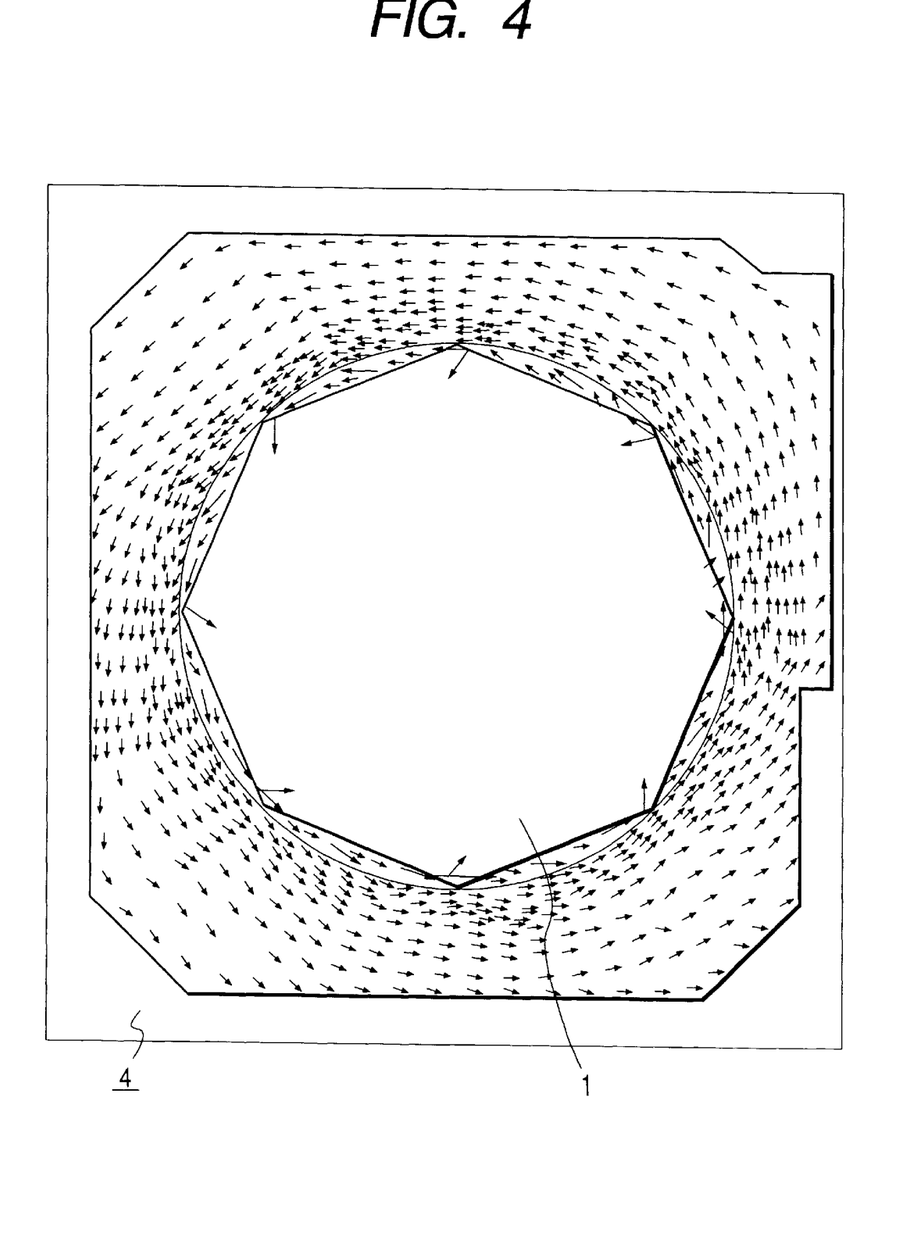
FIG. 4 is a diagram to show the air flow occurring around the rotary polygon mirror.

When the flow passage is uniform around the rotary polygon mirror 1 by provision of the cover 4 with the slit 40 opening toward the entire periphery of the rotary polygon mirror 1 as in the present embodiment, the air flow becomes uniform inside the cover 4 with rotation of the rotary polygon mirror 1, so that the pressure gradient can be prevented from occurring around the rotary polygon mirror 1, as shown in FIG. 4.

Figure 5:
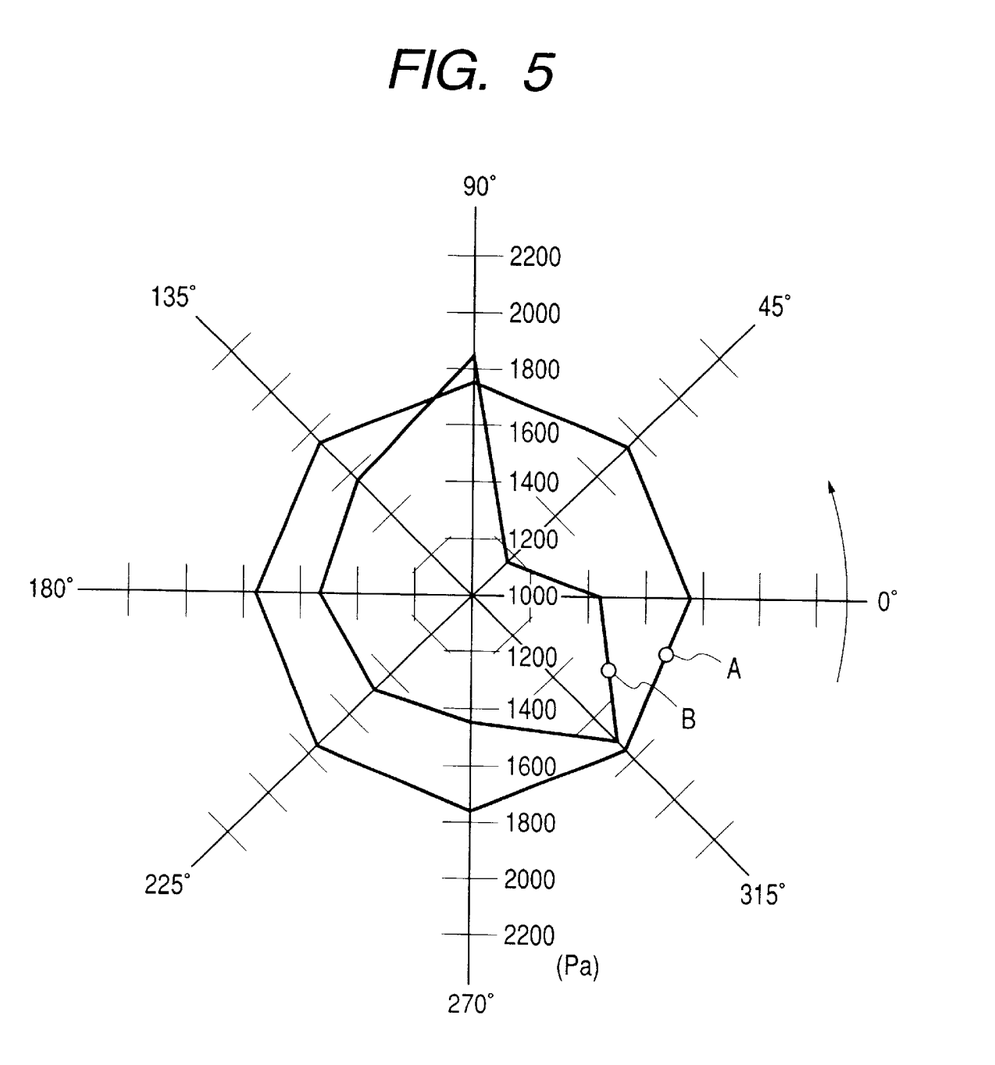
FIG. 5 is a graph to show change in pressure around the rotary polygon mirror.

FIG. 5 is a graph to a comparison of the pressure differences (pressure amplitudes) during rotation at the edges of a conventional eight-sided rotary polygon mirror and the inventive mirror shown in FIGS. 3A and 3B. The direction of 0° is a direction where the dustproof glass 5 is disposed.

In the case wherein the window locally opening in the arcuate shape is provided opposite the peripheral surface of the rotary polygon mirror as in the conventional example, the air flow near the window changes as shown in FIG. 2, and the pressure decreases suddenly there. As a result, a significant pressure decrease occurs in the direction of the angle where the window is open, for example as shown by the graph B of FIG. 5.

For this reason, the present embodiment adopts the annular slit with the small width opening toward the entire circumference of the rotary polygon mirror and uses a part thereof as a window for incidence and emergence of the light beam as described above, whereby variation is prevented in the air flow around the rotary polygon mirror, resulting in a move uniform pressure distribution in the circumferential direction as shown by the graph A of FIG. 5. This greatly decreases the wind noise itself of the rotary polygon mirror and thus decreases the load on the motor due to nonuniform pressure, thereby reducing the vibration of the motor and also decreasing the vibration of the optical box etc. caused by propagation of the vibration of the motor.

In this way, the noise caused by the optical deflecting-scanning apparatus can be decreased greatly, and digital copiers etc. suitable for high speed operation with low operating sound can be realized using it.

Experiments verified that use of only the air guide with the annular slit extending in the circumferential direction achieved a noise reducing effect of about 10 dB, as compared with the conventional example.

Figure 6:
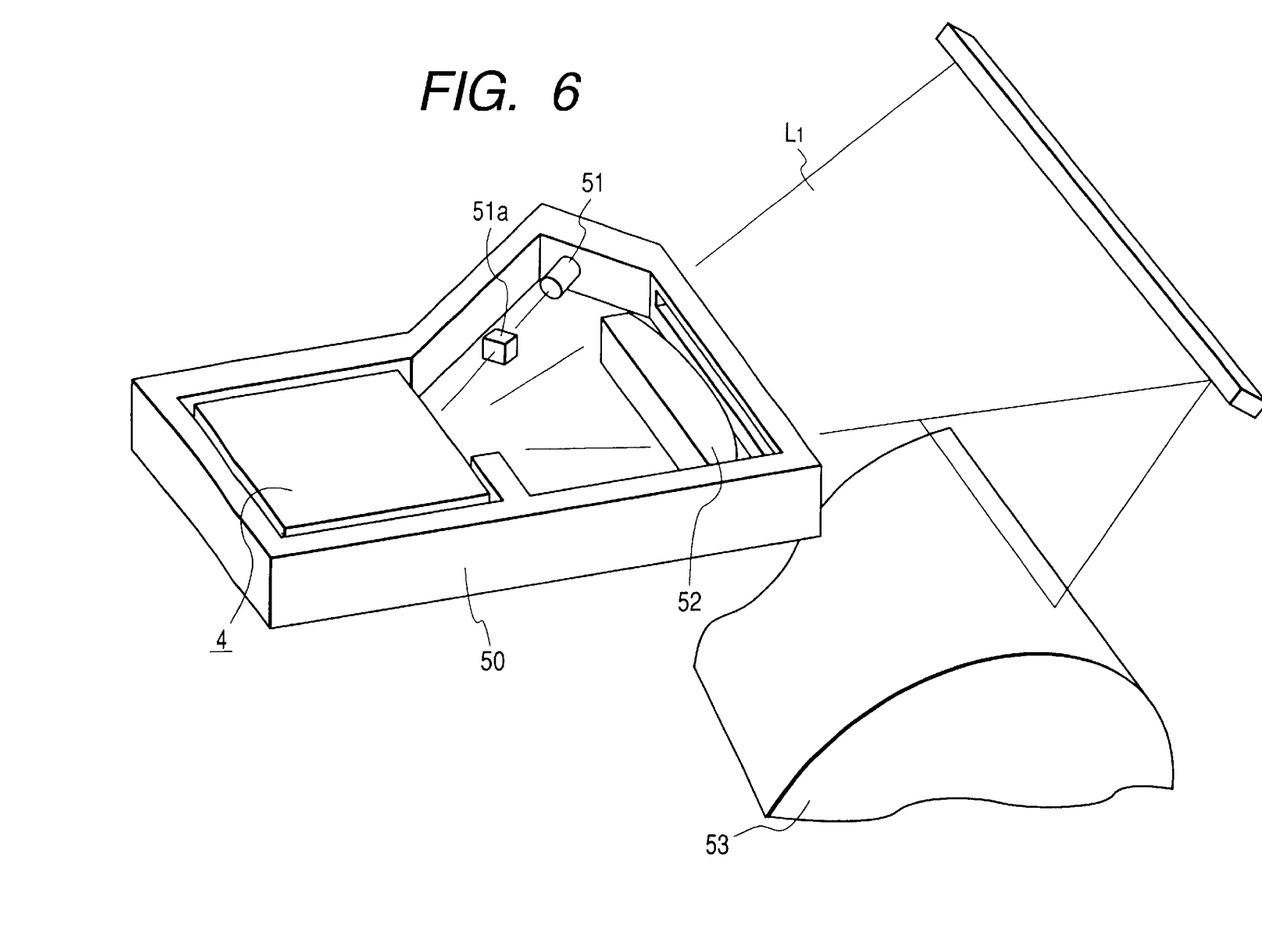
FIG. 6 is a drawing to illustrate the whole of the optical deflecting-scanning apparatus.

FIG. 6 illustrates the whole of the optical deflecting-scanning apparatus, and this apparatus has a light source 51 for generating a light beam $L_1$ (optical flux) such as a laser beam, and a cylindrical lens 51a for converging the light beam into a linear shape on the reflective surface 1a of the rotary polygon mirror 1. The light beam is deflected to scan with rotation of the rotary polygon mirror 1 and passes through an imaging lens 52 to be focused on a photosensitive member 53, which is a recording medium, on a rotating drum. The imaging lens 52 has the so-called fθ function for effecting correction for scanning speed etc. of the point image formed on the photosensitive member 53.

As the motor 3 rotates the rotary polygon mirror 1, its reflective surfaces 1*a* rotate at a uniform rate about the axis of the rotary polygon mirror 1. Angles between the optical path of the light beam $L_1$, generated by the light source 51 and converged by the cylindrical lens 51*a* as described above, and the normal line to the reflective surface 1*a* of the rotary polygon mirror 1, i.e., angles of incidence of the light beam $L_1$ to the reflective surface 1*a*, temporally change with rotation of the rotary polygon mirror 1; and angles of reflection also change similarly. Therefore, the point image, formed by the light beam $L_1$ focused on the photosensitive member 53, moves in the axial direction (in the main scanning direction) of the rotating drum.

The imaging lens 52 is one designed so as to focus the light beam reflected by the rotary polygon mirror 1 into the point image of a predetermined spot shape on the photosensitive member 53 and so as to keep the scanning speed of the point image uniform in the main scanning direction.

The point image formed on the photosensitive member 53 forms an electrostatic latent image with main scan according to rotation of the rotary polygon mirror 1 and with sub-scan according to rotation of the photosensitive member 53 about the axis of the rotating drum.

Around the photosensitive member 53 there are a corona discharger for uniformly charging the surface of the photosensitive member 53, a developing device for developing the electrostatic latent image formed on the surface of the photosensitive member 53, into a toner image, a transfer corona discharger for transferring the toner image onto a recording sheet, etc. (these members are not illustrated), and the recording information transferred by the light beam $L_1$ emitted from the light source 51 is printed on the recording sheet or the like.

The light source 51 generates the light beam according to signals supplied from a processing circuit for processing information from a host computer. The signals supplied to the light source 51 correspond to the information to be written on the photosensitive member 53, and the processing circuit supplies to the light source 51 units of signals, each unit being a signal to indicate information corresponding to one scanning line being a locus formed by the point image focused on the surface of the photosensitive member 53.

The rotary polygon mirror 1, the imaging lens 52, etc. are housed in the optical box 50, and the light source 51 etc. are mounted on the side wall of the optical box 50. The rotary polygon mirror 1, the imaging lens 52, etc. are first assembled in the optical box 50 and then a lid (not illustrated) is mounted over the aperture in the top part of the optical box 50.

In the optical deflecting-scanning apparatus of the present invention, the cover 4 covering the rotary polygon mirror 1 surrounds the outside peripheral surface of the rotary polygon mirror 1 by the cylindrical air guide 4*a* having the annular slit 40, thereby forming the uniform flow passage around the rotary polygon mirror 1. The light beam $L_1$ deflected to scan by the rotary polygon mirror 1 is incident and emergent through a part of the slit 40. The uniform air flow is generated around the rotary polygon mirror 1 with rotation of the rotary polygon mirror 1, so that the pressure distribution becomes uniform.

The present invention achieves the following effect because of the above structure. The noise caused with rotation of the rotary polygon mirror is remarkably reduced by preventing the pressure gradient from being produced in the cover covering the rotary polygon mirror with rotation thereof. This realizes the image forming apparatus etc. suitable for high speed operation with low operating sound.

What is claimed is:

1. An optical deflecting-scanning apparatus comprising:

a deflector for deflecting a light beam to scan;

driving means for rotationally driving said deflector;

a cover having a cylindrical portion to cover a peripheral surface of said deflector; and an annular slit provided in said cylindrical portion of said cover and extending in a circumferential direction of said deflector, said slit opening along the entire circumference of said deflector, wherein said cover comprises a first cylindrical member for covering a top half of said deflector, and a second cylindrical member for covering a bottom half of said deflector, and wherein said annular slit is formed between said first and second cylindrical members, and wherein a part of said first cylindrical member is constructed so as to cover the outside of said second cylindrical member.

2. The optical deflecting-scanning apparatus according to claim 1, wherein said deflector is a rotary polygon mirror.

3. The optical deflecting-scanning apparatus according to claim 1, wherein said second cylindrical member stands on said driving means.

4. A scanning optical apparatus comprising:

a light source portion;

a deflector for deflecting a light beam from said light source portion to scan;

driving means for rotationally driving said deflector;

a cover having a cylindrical portion to cover a peripheral surface of said deflector; and an annular slit provided in said cylindrical portion of said cover and extending in a circumferential direction of said deflector, said slit opening along the entire circumference of said deflector, wherein said cover comprises a first cylindrical member for covering a top half of said deflector, and a second cylindrical member for covering a bottom half of said deflector, and wherein said annular slit is formed between said first and second cylindrical members, and wherein a part of said first cylindrical member is constructed so as to cover the outside of said second cylindrical member.

5. The scanning optical apparatus according to claim 4, wherein said deflector is a rotary polygon mirror.

6. The scanning optical apparatus according to claim 4, wherein said second cylindrical member stands on said driving means.

7. An image forming apparatus comprising:

a light source portion;

a deflector for deflecting a light beam from said light source portion to scan;

a recording medium for receiving the light beam deflected to scan by said deflector;

driving means for rotationally driving said deflector;

a cover having a cylindrical portion to cover a peripheral surface of said deflector; and an annular slit provided in said cylindrical portion of said cover and extending in a circumferential direction of said deflector, said slit opening along the entire circumference of said deflector, wherein said cover comprises a first cylindrical member for covering a top half of said deflector, and a second cylindrical member for covering a bottom half of said deflector, and wherein said annular slit is formed between said first and second cylindrical members, and wherein a part of said first cylindrical member is constructed so as to cover the outside of said second cylindrical member.

8. The image forming apparatus according to claim 7, wherein said deflector is a rotary polygon mirror.

9. The image forming apparatus according to claim 7, wherein said second cylindrical member stands on said driving means.

10. An optical deflecting apparatus, comprising:
a deflector capable of deflecting a light beam to scan;
driving means for rotationally driving said deflector;
a cover which covers said deflector;
a wall provided between said deflector and said cover, said wall being located apart from said cover in the direction of the optical axis; and
an annular slit provided in said wall, said slit extending along an entire circumference of said deflector.

11. The apparatus according to claim 10, wherein said deflector comprises a rotary polygon mirror.

12. The apparatus according to claim 10, wherein said wall comprises a first cylindrical member surrounding a top half of said deflector and a second cylindrical member surrounding a bottom half of said deflector, and wherein said slit is formed between said first and second cylindrical members.

13. The apparatus according to claim 12, wherein said second cylindrical member stands on said driving means.

14. The apparatus according to claim 12, wherein said cover surrounds said first and second cylindrical members.

15. An optical deflecting apparatus to be housed in a box which houses an fθ lens, comprising:
a deflector capable of deflecting a light beam to scan;
driving means for rotationally driving said deflector;
a cover which covers said deflector and is adapted to be housed in the box;
a wall provided between said deflector and said cover, said wall being located apart from said cover in the direction of the optical axis; and
a slit provided in said wall.

16. The apparatus according to claim 15, wherein said deflector comprises a rotary polygon mirror.

17. The apparatus according to claim 15, wherein said wall comprises a first cylindrical member surrounding a top half of said deflector and a second cylindrical member surrounding a bottom half of said deflector, and wherein said slit is formed between said first and second cylindrical members.

18. The apparatus according to claim 17, wherein said second cylindrical member stands on said driving means.

19. The apparatus according to claim 17, wherein said cover surrounds said first and second cylindrical members.

20. The apparatus according to claim 15, wherein said slit extends annularly along an entire circumference of said deflector.

21. An image forming apparatus comprising:
(i) image-bearing means; and
(ii) an optical deflecting apparatus located in a box, said optical deflecting apparatus comprising:
a deflector capable of deflecting a light beam to scan;
driving means for rotationally driving said deflector;
a cover which covers said deflector and is housed in the box;
a wall provided between said deflector and said cover, said wall being located apart from said cover in the direction of the optical axis; and
a slit provided in said wall.

22. The image forming apparatus according to claim 21, wherein said deflector is a rotary polygon mirror.

23. The image forming apparatus according to claim 21, wherein said wall comprises a first cylindrical member surrounding a top half of said deflector and a second cylindrical member surrounding a bottom half of said deflector, and wherein said slit is formed between said first and second cylindrical members.

24. The image forming apparatus according to claim 23, wherein said second cylindrical member stands on said driving means.

25. The image forming apparatus according to claim 23, wherein said cover surrounds said first and second cylindrical members.

26. The image forming apparatus according to claim 21, wherein said slit extends annularly along the entire circumference of said deflector.

\* \* \* \* \*

UNITED STATES PATENT AND TRADEMARK OFFICE
CERTIFICATE OF CORRECTION

PATENT NO. : 6,285,482 B1
DATED : September 4, 2001
INVENTOR(S) : Nobuaki Date

It is certified that error appears in the above-identified patent and that said Letters Patent is hereby corrected as shown below:

Drawings,
"FIG. 1A" should read -- FIG. 1A (PRIOR ART) --;
"FIG. 1B" should read -- FIG. 1B (PRIOR ART) --; and
"FIG. 2" should read -- FIG. 2 (PRIOR ART) --.

Column 3,
Line 17, "thereof:" should read -- thereof; --.

Column 4,
Line 15, "guide 4a" should read -- guide 4a, --;
Line 27, "to" should read -- to show --; and
Line 47, "move" should read -- more --.

Signed and Sealed this

Thirtieth Day of April, 2002

Attest:

Attesting Officer

JAMES E. ROGAN
Director of the United States Patent and Trademark Office